(12) United States Patent
Alexander et al.

(10) Patent No.: US 11,572,744 B2
(45) Date of Patent: Feb. 7, 2023

(54) CASING ROLLER APPARATUS

(71) Applicants: Russell Alexander, Tow, TX (US); Danny R. Watkins, Gilmer, TX (US)

(72) Inventors: Russell Alexander, Tow, TX (US); Danny R. Watkins, Gilmer, TX (US)

(*) Notice: Subject to any disclaimer, the term of this patent is extended or adjusted under 35 U.S.C. 154(b) by 247 days.

(21) Appl. No.: 16/947,285

(22) Filed: Jul. 27, 2020

(65) Prior Publication Data

US 2021/0025249 A1 Jan. 28, 2021

Related U.S. Application Data

(60) Provisional application No. 62/879,092, filed on Jul. 26, 2019.

(51) Int. Cl.
*E21B 19/00* (2006.01)

(52) U.S. Cl.
CPC ............................. *E21B 19/00* (2013.01)

(58) Field of Classification Search
CPC .............. E21B 19/00; B65G 7/10; B65G 7/12
See application file for complete search history.

(56) References Cited

U.S. PATENT DOCUMENTS

| 1,580,188 | A | * | 4/1926 | Wright | C03B 23/045 414/24 |
| 2,472,662 | A | * | 6/1949 | King | B65G 7/12 248/316.5 |
| 2,842,272 | A | * | 7/1958 | Folks | B05C 13/00 414/746.3 |
| 3,519,304 | A | * | 7/1970 | Shores | B25B 9/00 294/97 |

* cited by examiner

*Primary Examiner* — Aaron L Lembo
(74) *Attorney, Agent, or Firm* — Hall Estill Law Firm

(57) ABSTRACT

A casing roller apparatus including an actuation apparatus for facilitating operation of the casing roller apparatus and an engagement apparatus for securely engaging a unit of casing to permit an oilfield worker to roll the unit of casing. The casing roller apparatus is used in a method of engaging a unit of casing with the casing roller apparatus and rolling the unit of casing from a first location to a second location.

17 Claims, 5 Drawing Sheets

CASING ROLLER APPARATUS

CROSS-REFERENCE TO RELATED APPLICATIONS

The present application is a conversion of U.S. Provisional Application having U.S. Ser. No. 62/879,092, filed Jul. 26, 2019, which claims the benefit under 35 U.S.C. 119(e), the disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a casing roller apparatus for engaging oil and gas well casing to roll the casing to a desired location.

2. Description of the Related Art

Casing is large-diameter pipe lowered into an openhole and cemented into place. The casing is designed to withstand a variety of forces, such as collapse, burst and tensile failure, as well as chemically aggressive brines. Casing is typically forty (40) feet lengths of metal piping that are extremely heavy and supplied to an oil and gas well on a trailer where they can be rolled from one position to another. Historically, oilfield workers have rolled the casing to desired locations by hand, which is a serious safety issue due to the potential of hands getting crushed between the units of casing.

Accordingly, there is a need for an apparatus that oilfield workers can use to roll the casing on the trailers while keeping their hands free from being crushed between units of casing.

SUMMARY OF THE INVENTION

The present disclosure is directed to a casing roller apparatus. The casing roller including an actuation apparatus for facilitating operation of the casing roller apparatus and an engagement apparatus for securely engaging a unit of casing to permit an oilfield worker to roll the unit of casing.

The present disclosure is also directed toward a method of using the casing roller apparatus. The method includes the step of engaging a unit of casing with the casing roller apparatus and rolling the unit of casing from a first location to a second location.

DETAILED DESCRIPTION OF THE DISCLOSURE

Figure 1:
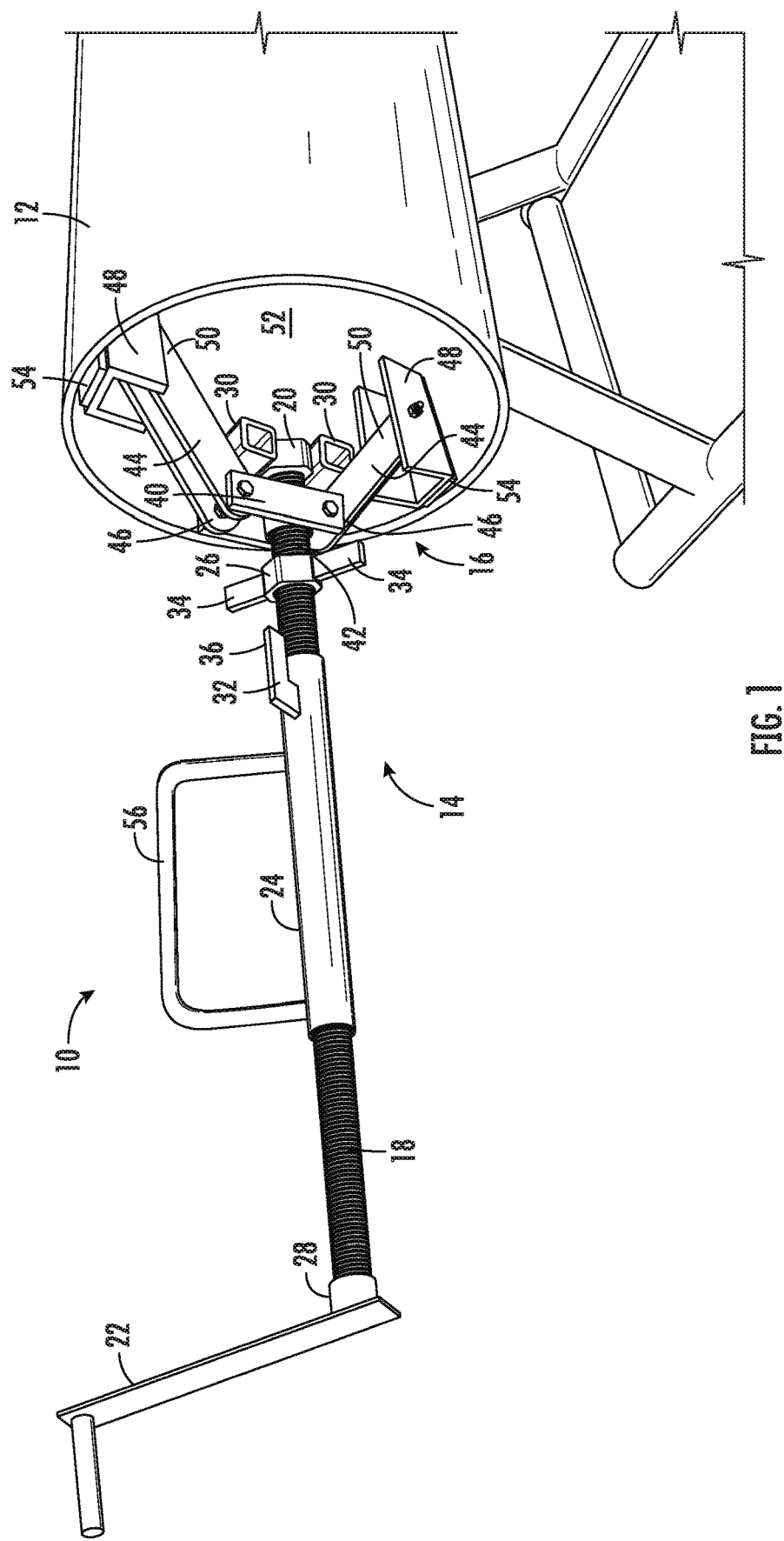
FIG. 1 is a perspective view of a casing roller apparatus constructed in accordance with the present disclosure.
Figure 2:
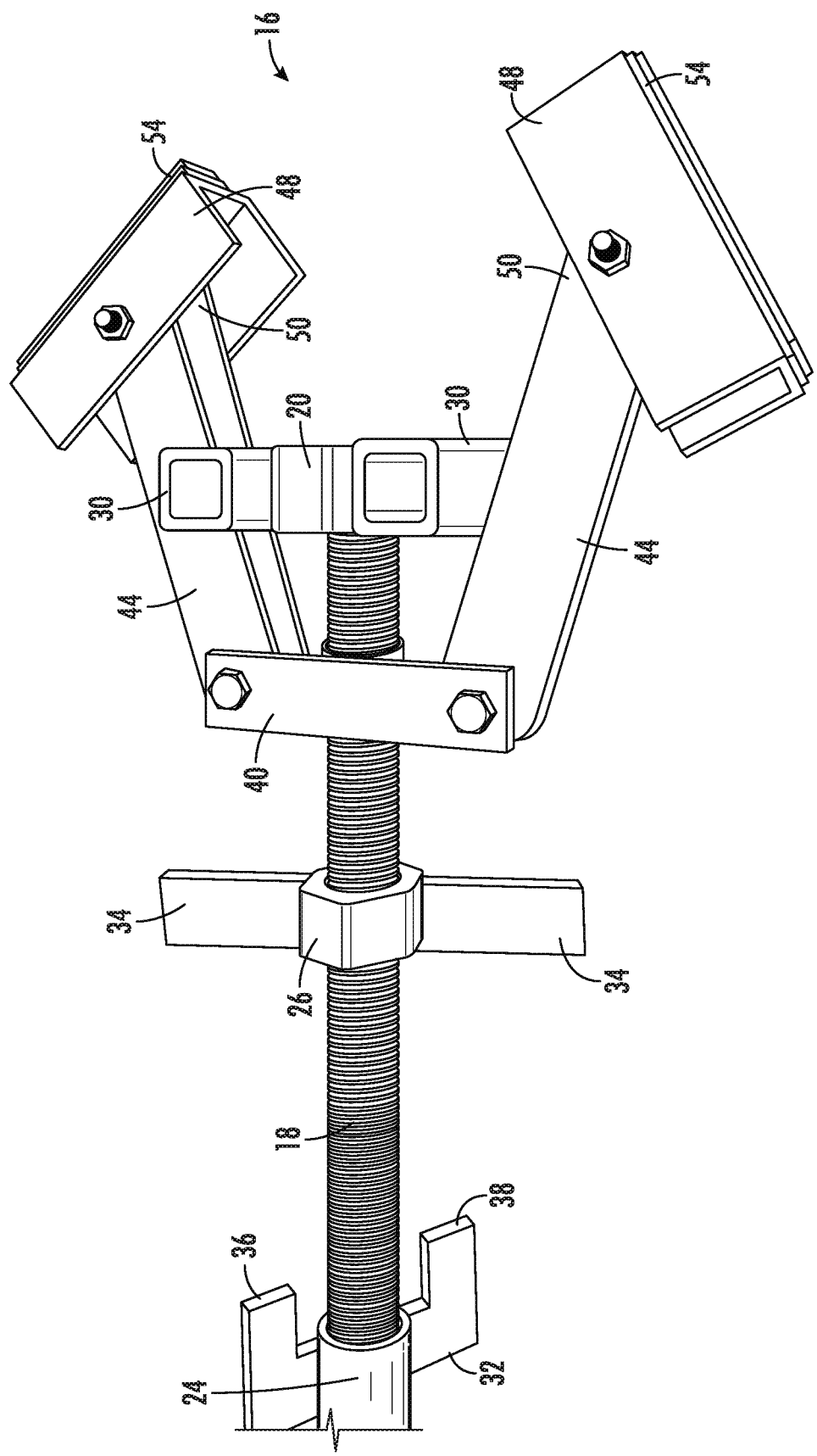
FIG. 2 is a perspective view of a portion of the casing roller apparatus constructed in accordance with the present disclosure.
Figure 3:
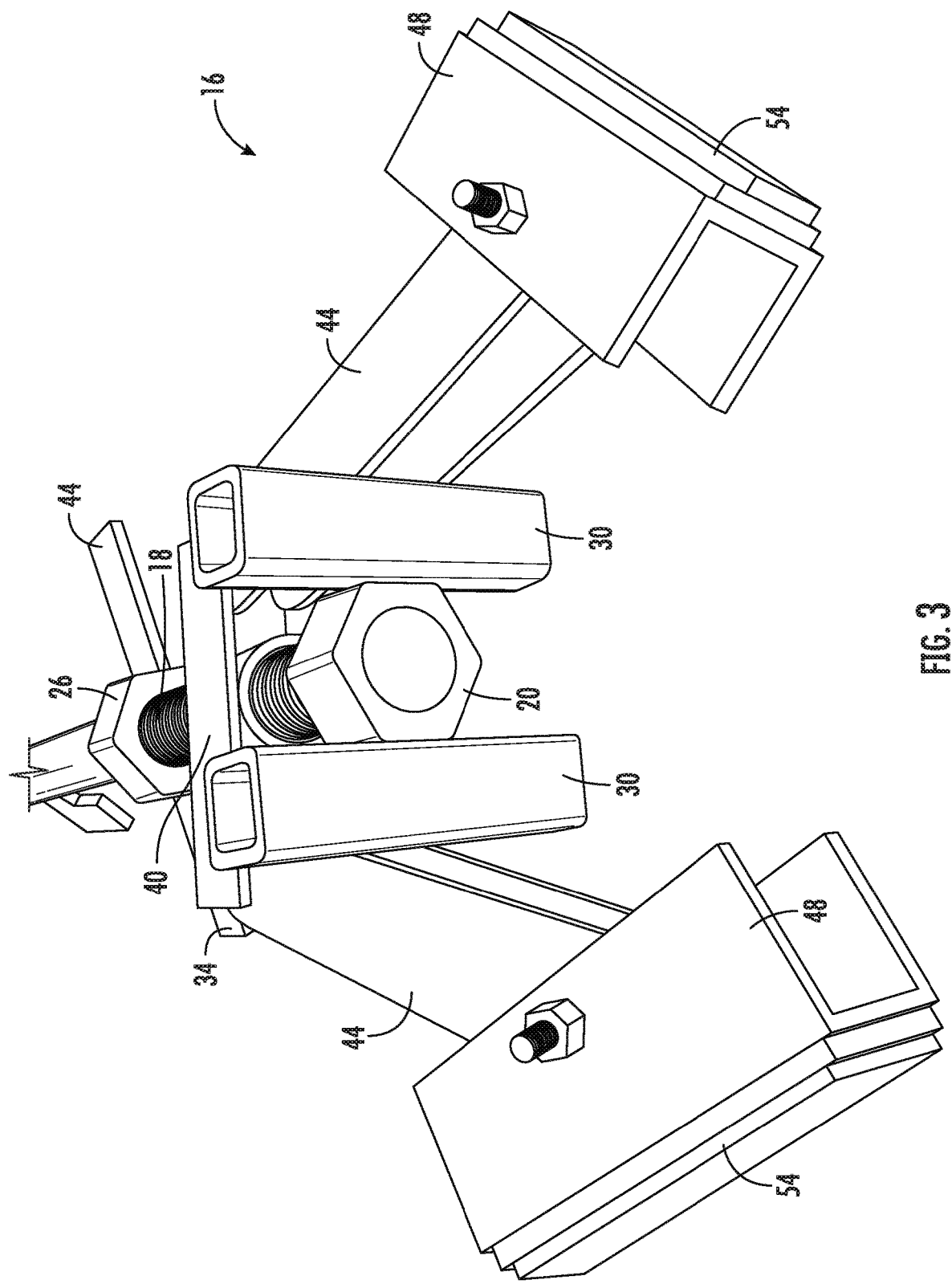
FIG. 3 is a perspective view of another portion of the casing roller apparatus in a retracted position constructed in accordance with the present disclosure.
Figure 4:
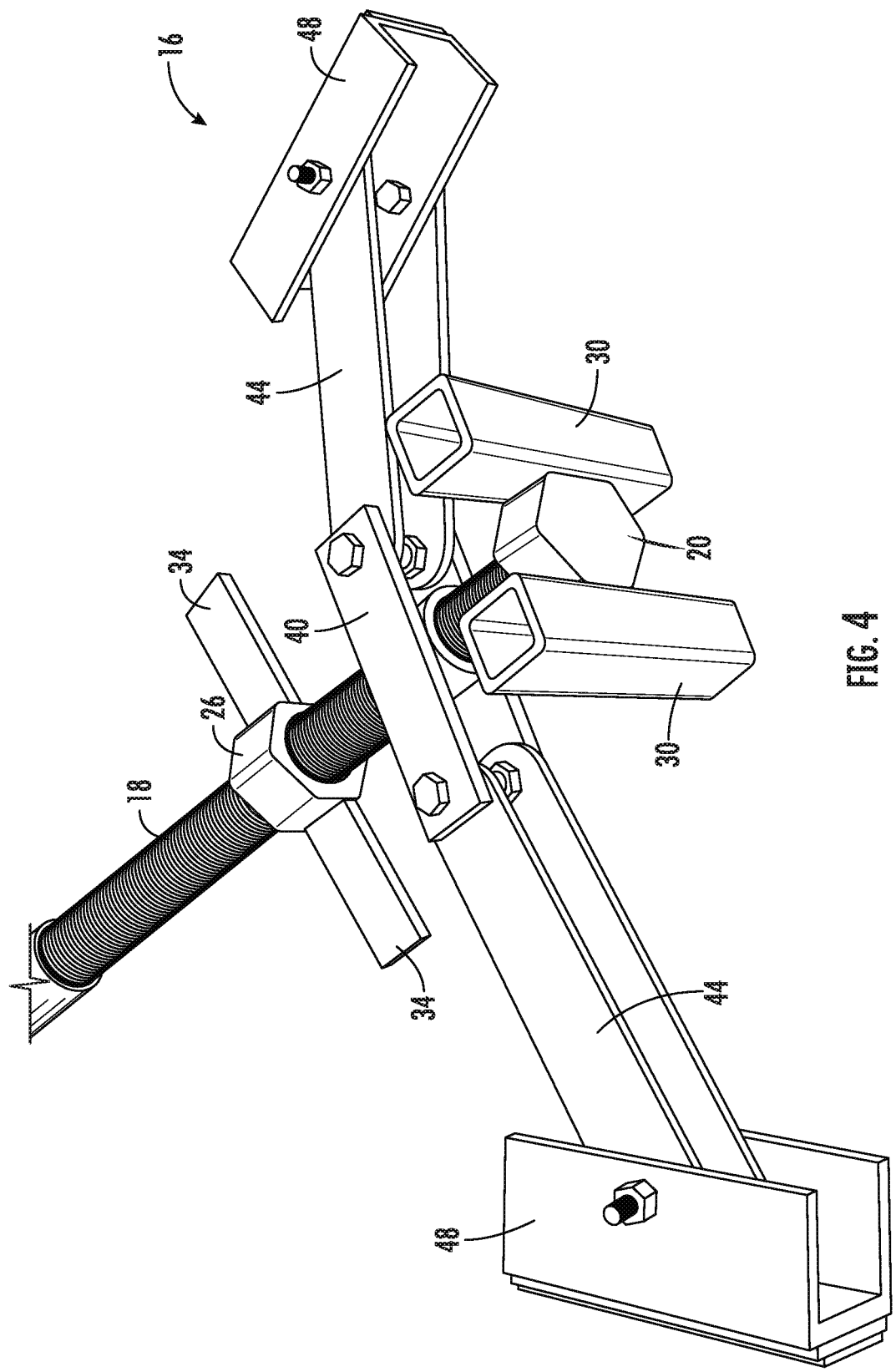
FIG. 4 is a perspective view of the portion of the casing roller apparatus shown in FIG. 3 in an expanded configuration constructed in accordance with the present disclosure.

The present disclosure relates to a casing roller apparatus 10 for engaging a unit of casing 12 and rolling it from one location to another, typically, on a trailer or truck that holds the casing 12 prior to installing the casing 12 in the well. The casing roller apparatus includes an actuation apparatus 14 for facilitating operation of the casing roller apparatus 10 and an engagement apparatus 16 for securely engaging the casing to permit an oilfield worker to roll each unit of casing 12.

The actuation apparatus 14 transitions the casing roller apparatus 10 from an engaged position with the casing 12 to a disengaged position from the casing 12. Conversely, the actuation apparatus 14 also transitions the casing roller apparatus 10 from the disengaged position from the casing 12 to the engaged position with the casing 12. The engagement apparatus 16 securely contacts the inside of the casing 12 when the casing roller apparatus 10 is in the engaged position and the engagement apparatus 16 is free to move inside the casing 12 (i.e. not securely contacting the inside of the casing 12) when the casing roller apparatus 10 is in the disengaged position.

The actuation apparatus 14 includes a threaded shaft 18 with a separator element 20 disposed on one end to interact with the engagement apparatus 16 and a turn handle 22 on the other end to facilitate movement of the casing 12 when the casing roller apparatus 10 is in the engaged position with the casing 12. The actuation apparatus 14 can also include an unthreaded sleeve 24 disposed around the threaded shaft 18 to contribute to the operation of the casing roller apparatus 10 and an operational nut 26 that is threaded on the threaded shaft 18 between the unthreaded sleeve 24 and the separation element 20. The actuation apparatus 14 can also include an abutment element 28 securely disposed around the threaded shaft 18 to keep the unthreaded sleeve 24 a certain distance away from the turn handle 22 to make operation of the casing roller apparatus 10 more efficient. The separator element 20 of the actuation apparatus 14 can have extension portions 30 that extend out and prevent the engagement apparatus 16 from rotating independently of the actuation apparatus 14 during certain operations of the casing roller apparatus 10.

The unthreaded sleeve 24 of the actuation apparatus 14 can include a U-shaped flange 32 disposed on one end that can engage at least one flange 34 that extends outwardly from the operational nut 26 of the actuation apparatus 14. The U-shaped flange 32 includes a first leg 36 and a second leg 38 that engage the flange 34 on the operational nut 26. In one embodiment, the operational nut 26 can include at least two flanges 34 that extend outwardly. In another embodiment, the U-shaped flange 32 can include additional flange portions and leg portions to provide additional places where the unthreaded sleeve 24 can engage and manipulate the operational nut 26.

The engagement apparatus 16 of the casing roller apparatus 10 includes a base portion 40 with an opening 42 disposed therein. The threaded shaft 18 of the actuation apparatus 14 extends through the opening 42 in the base portion 40 of the engagement apparatus 16. The base portion 40 of the engagement apparatus 16 is positioned on the threaded shaft 18 of the actuation apparatus 14 between the separator element 20 and the operational nut 26 of the actuation apparatus 14. The engagement apparatus 16 further includes at least two arms 44 that are rotationally attached to the base portion 40 at first ends 46 of the arms 44. The engagement apparatus 16 can also include contact elements 48 rotatably disposed on second ends 50 of the arms 44 to be forced into contact with the inside 52 of the casing 12. In one embodiment, the contact elements 48 can have a gripping layer 54 disposed thereon to optimize the frictional engagement between the contact elements 48 and the inside 52 of the casing 12. The gripping layer 54 can be any type of material that can more efficiently cause the contact element 48 to engage the inside 52 of the casing 12, such as a polymeric material.

In use, an oil field worker will place the engagement apparatus 16 inside an end of the casing 12 and turn the operational nut 26 toward the base portion 40 of the engagement apparatus 16. Continuing to turn the operational nut 26 will force the base portion 40 towards the separator element 20 disposed on the end of the threaded shaft 18. The operational nut 26 can be turned with the U-shaped flange 32 of the unthreaded sleeve 24 engaging the flanges 34 of the operational nut 26. As the base portion 40 is forced towards the separator element 29, the separator element 20 will force the arms 44 of the engagement apparatus 16 outward towards an inner wall 52 of the casing 12. Eventually, the contact elements 48 on the second ends 50 of the arms 44 will be securely forced into the inner wall 52 of the casing 12. The oilfield worker can then apply rotational force to the turn handle 22 of the actuation apparatus 14 to roll the casing 12. The oilfield worker can keep one hand on the unthreaded sleeve 24 (or a handle 56 on the unthreaded sleeve), which allows all other portions of the casing roller apparatus 10 to rotate as the turn handle 22 is rotated.

To disengage the casing roller apparatus 10 from the casing 12, the oilfield worker would unlock the operational nut 26 from forcing the base portion 40 of the engagement apparatus 16 against the separator element 20 to permit the arms 44 of the engagement apparatus 16 to rotate away and disengage the contact elements 48 from the inner wall 52 of the casing 12. The operational nut 26 can be unlocked by rotating the operational nut 26 away from the base portion 40 of the engagement apparatus 16. The U-shaped flange 32 on the unthreaded sleeve 24 can engage the flanges 34 on the operational nut 26 to rotate the operational nut 26 in a desired direction.

It should be understood and appreciated that the casing roller apparatus 10 can be any type of handheld device that can engage the inner portion 52 of the casing 12 and allow an oilfield worker to roll the casing 12. The casing roller apparatus 10 can also have ratchet joints that permit the engagement in certain directions and allow free movement in the opposite direction. The ratchet joints could also be reversible depending on the desired function of the casing roller apparatus 12. The threads on the threaded shaft 18 can also be reversed to accomplish different workings of the casing roller apparatus 10.

The casing roller apparatus can also comprise motors to accomplish some of the rotational movement required for the casing roller apparatus to work properly.

The present disclosure is also directed to a method rolling units of casing 12 by a handheld and hand operated mechanical tool. A user will engage the unit of casing 12 with the handheld tool. The user will secure the handheld tool to the unit of casing 12. The user can apply rotational force to the tool that is transferred to the unit of casing 12. In one embodiment of the present disclosure, a portion of the handheld tool engages the inner part 52 of the casing 12 to facilitate the rolling of the unit of casing 12. In another embodiment, the handheld tool engages more than one place on the inner portion 52 of the unit of casing 12.

Figure 5:
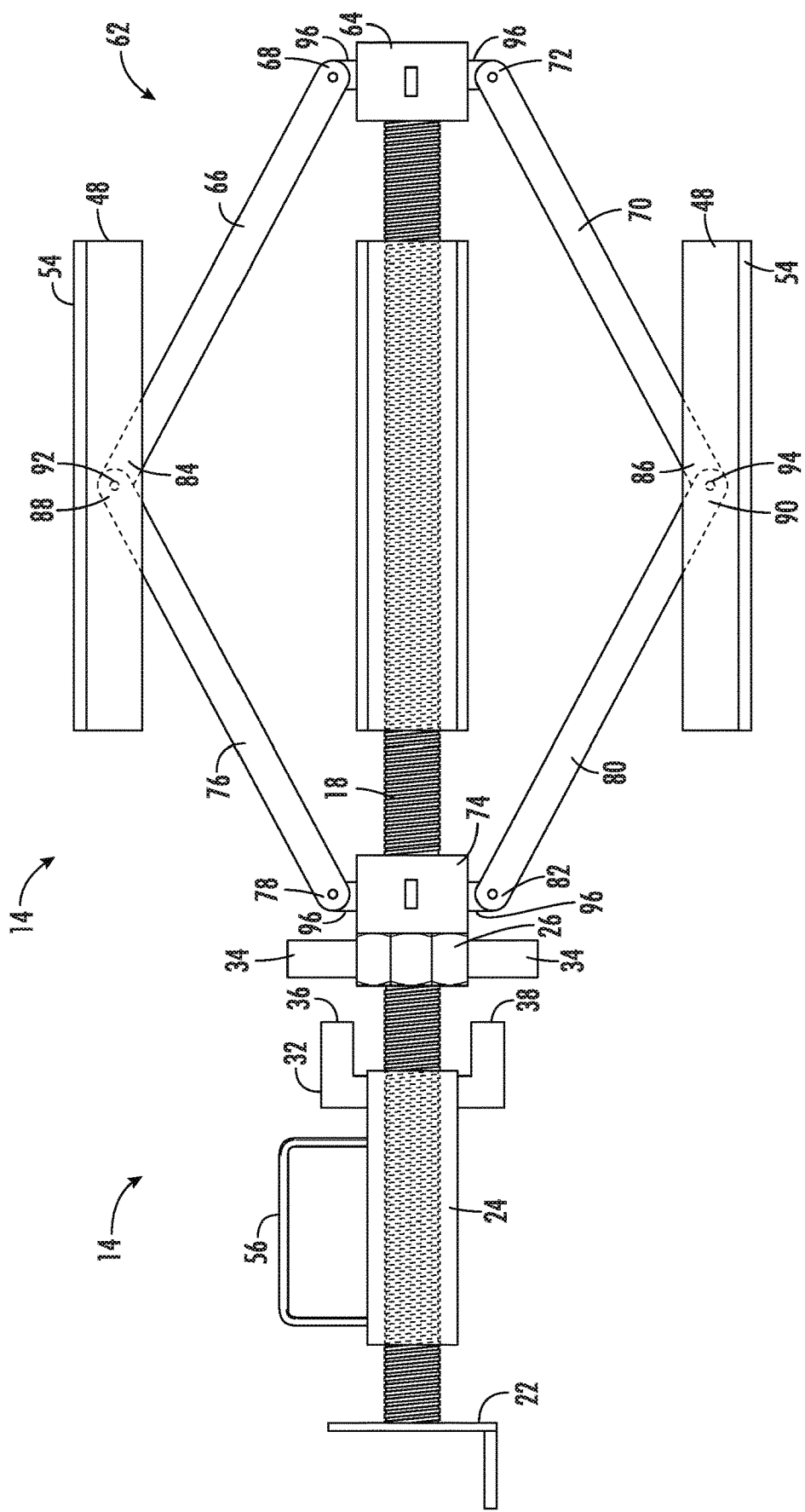
FIG. 5 is perspective view of another embodiment of the casing roller apparatus constructed in accordance with the present disclosure.

In another embodiment of the present disclosure shown in more detail in FIG. 5, another variation of an engagement apparatus 62 is shown. The engagement apparatus 62 includes an end portion 64 disposed on the end of the threaded shaft 18. The end portion 64 has a first arm 66 hingedly or rotatably supported, connected or attached to one side of the end portion 64 at a first end 68 of the first arm 66 and a second arm 70 hingedly or rotatably supported, connected or attached to the other side of the end portion 64 at a first end 72 of the second arm 70. The engagement apparatus 62 can also include a second unthreaded sleeve 74 disposed around the threaded shaft 18 on the opposite side of the operational nut 26 from the unthreaded sleeve 24. The second unthreaded sleeve 74 has a third arm 76 hingedly or rotatably supported, connected or attached to one side of the second unthreaded sleeve 74 at a first end 78 of the third arm 76 and a fourth arm 80 hingedly or rotatably supported, connected or attached to the other side of the second unthreaded sleeve 74 at a first end 82 of the fourth arm 80.

The first, second, third and fourth arms 66, 70, 76 and 80 have second ends 84, 86, 88 and 90, respectively. The second end 84 of the first arm 66 is hingedly connected to the second end 88 of the third arm 76 to create a first hinged portion 92. Similarly, the second end 86 of the second arm 70 is hingedly connected to the second end 90 of the fourth arm 80 to create a second hinged portion 94. The contact elements 48 can be hingedly supported or connected to the first and second hinged portions 92 and 94 of the engagement apparatus 62. The first ends 68, 72, 78 and 82 of the first, second, third and fourth arms 66, 70, 76 and 80, respectively, can be supported by or attached to flange elements 96 that extend from the end portion 64 or the second unthreaded sleeve 74.

In use and similar to the embodiments disclosed in FIGS. 1-7, an oil field worker will place the engagement apparatus 62 inside an end of the casing 12 and turn the operational nut 26 toward the second unthreaded sleeve 74 or the end portion of the threaded shaft 18 of the engagement apparatus 62. Continuing to turn the operational nut 26 will force the second unthreaded sleeve 74 towards the end portion 64 disposed on the end of the threaded shaft 18. The operational nut 26 can be turned with the U-shaped flange 32 of the unthreaded sleeve 24 engaging the flanges 34 of the operational nut 26 or by hand. As the second unthreaded sleeve 74 is forced towards the end portion 64 of the threaded shaft 18, the second ends 84, 86, 88 and 90 of the first, second, third and fourth arms 66, 70, 76 and 80, respectively, of the engagement apparatus 16 are forced outward from the threaded shaft 18 and towards the inner wall 52 of the casing 12. Eventually, the contact elements 48 disposed on the first and second hinged portions 92 and 94 will be securely forced into the inner wall 52 of the casing 12. The oilfield worker can then apply rotational force to the turn handle 22 of the actuation apparatus 14 to roll the casing 12. The oilfield worker can keep one hand on the unthreaded sleeve 24 (or a handle 56 on the unthreaded sleeve), which allows all other portions of the casing roller apparatus 10 to rotate as the turn handle 22 is rotated.

To disengage the casing roller apparatus 10 from the casing 12, the oilfield worker would unlock the operational nut 26 from forcing the second unthreaded sleeve 74 towards the end portion 64 to permit the second ends 84, 86, 88 and 90 of the first, second, third and fourth arms 66, 70, 76 and 80, respectively, the engagement apparatus 62 to move away from the inner wall 52 of the casing 12 and disengage the contact elements 48 from the inner wall 52 of the casing 12. The operational nut 26 can be unlocked by rotating the operational nut 26 away from the second unthreaded sleeve 74 of the engagement apparatus 62. The U-shaped flange 32 on the unthreaded sleeve 24 can engage the flanges 34 on the operational nut 26 to rotate the operational nut 26 in a desired direction.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A casing roller apparatus, the apparatus comprising:
   an actuation apparatus for facilitating operation of the casing roller apparatus; and
   an engagement apparatus for securely engaging a unit of casing to permit an oilfield worker to roll the unit of casing, the actuation apparatus using rotational force to cause the engagement apparatus to securely engage the unit of casing.

2. The casing roller apparatus of claim 1 wherein the actuation apparatus includes an operational nut rotatably disposed on a threaded shaft and an unthreaded sleeve disposed around the threaded shaft to manipulate the operational nut.

3. The casing roller apparatus of claim 1 wherein the threaded shaft includes a turn handle disposed on an end opposite of the engagement apparatus.

4. The casing roller apparatus of claim 1 wherein the engagement apparatus includes a base portion with a first arm and a second arm rotatably attached thereto.

5. The casing roller apparatus of claim 4 wherein the engagement apparatus further includes contact elements rotatably supported by the first and second arms to engage an inner wall of the unit of casing.

6. The casing roller apparatus of claim of claim 5 wherein the contact elements have a gripping layer disposed thereon to engage the inner wall of the unit of casing.

7. The casing roller apparatus of claim 2 includes a separator element disposed on an end of a threaded shaft that engages parts of the engagement apparatus.

8. A method of using a casing roller apparatus, the method comprising:
   engaging a unit of casing with the casing roller apparatus, the unit of casing is engaged by an engagement apparatus of the casing roller apparatus by applying rotational force to an actuation apparatus of the casing roller apparatus; and
   rolling the unit of casing from a first location to a second location.

9. The method of claim 8 wherein the casing roller apparatus engages the unit of casing on an inner wall of the unit of casing.

10. The method of claim 8 further comprising disengaging the casing roller apparatus from the unit of casing.

11. The method of claim 8 wherein the
    the actuation apparatus of the casing roller apparatus facilitates operation of the of the casing roller apparatus; and
    the engagement apparatus a securely engages the unit of casing to permit an oilfield worker to roll the unit of casing.

12. The method of claim 11 wherein the actuation apparatus includes an operational nut rotatably disposed on a threaded shaft and an unthreaded sleeve disposed around the threaded shaft to manipulate the operational nut.

13. The method of claim 11 wherein the threaded shaft includes a turn handle disposed on an end opposite of the engagement apparatus.

14. The method of claim 11 wherein the engagement apparatus includes a base portion with a first arm and a second arm rotatably attached thereto.

15. The method of claim 14 wherein the engagement apparatus further includes contact elements rotatably supported by the first and second arms to engage an inner wall of the unit of casing.

16. The method of claim of claim 15 wherein the contact elements have a gripping layer disposed thereon to engage the inner wall of the unit of casing.

17. The method of claim 12 includes a separator element disposed on an end of a threaded shaft that engages parts of the engagement apparatus.

* * * * *